United States Patent
Shimonomoto et al.

(10) Patent No.: US 7,315,237 B2
(45) Date of Patent: Jan. 1, 2008

(54) AUTOMOTIVE ANTITHEFT SYSTEM

(75) Inventors: Ifushi Shimonomoto, Okazaki (JP); Toshio Shimomura, Chiryu (JP)

(73) Assignee: DENSO CORPORATION, Kariya (JP)

( * ) Notice: Subject to any disclaimer, the term of this patent is extended or adjusted under 35 U.S.C. 154(b) by 125 days.

(21) Appl. No.: 11/012,177

(22) Filed: Dec. 16, 2004

(65) Prior Publication Data

US 2005/0151630 A1 Jul. 14, 2005

(30) Foreign Application Priority Data

Jan. 13, 2004 (JP) ............................ 2004-005782

(51) Int. Cl.
*B60R 25/10* (2006.01)
(52) U.S. Cl. ............................ 340/426.1; 340/426.12; 340/426.13; 340/426.16; 340/426.27; 340/426.28; 340/429
(58) Field of Classification Search ............ 340/426.1, 340/426.12, 426.13, 426.16, 426.27, 426.28, 340/429, 426.29
See application file for complete search history.

(56) References Cited

U.S. PATENT DOCUMENTS

| | | | |
|---|---|---|---|
| 5,543,776 A | 8/1996 | L'Esperance et al. | |
| 5,739,747 A * | 4/1998 | Flick | 340/426.15 |
| 6,335,679 B1 * | 1/2002 | Thomas et al. | 340/426.13 |
| 6,462,648 B1 * | 10/2002 | Stouffer et al. | 340/426.1 |
| 2003/0193390 A1 | 10/2003 | Muramatsu | |

FOREIGN PATENT DOCUMENTS

| | | |
|---|---|---|
| JP | 2001-341618 | 12/2001 |
| JP | 2002-10373 | 1/2002 |
| JP | 2003-34236 | 2/2003 |
| JP | 2003-95068 | 4/2003 |

OTHER PUBLICATIONS

First Office Action from Chinese Patent Office issued on Jun. 2, 2006 for the corresponding Chinese patent application No. 200510006230.X (a copy and English translation thereof).

* cited by examiner

*Primary Examiner*—Tai Nguyen
(74) *Attorney, Agent, or Firm*—Posz Law Group, PLC

(57) ABSTRACT

An automotive burglar alarm unit has an intrusion or equivalent security sensor. The burglar alarm unit can operate in an alarm set state for generating alarm, with a security sensor OFF mode for invalidating a signal of the security sensor. A user can use a portable phone to transmit a sensor ON signal via an information center. When the burglar alarm unit receives the sensor ON signal, the burglar alarm unit shifts into an alarm set state of security sensor ON mode so that the burglar alarm unit can generate alarm in response to a signal of the security sensor. Furthermore, the user can transmit a sensor OFF signal. In response to the sensor OFF signal, the burglar alarm unit shifts into an alarm set state of security sensor OFF mode so that no alarm is generated based on the signal of the security sensor.

20 Claims, 9 Drawing Sheets

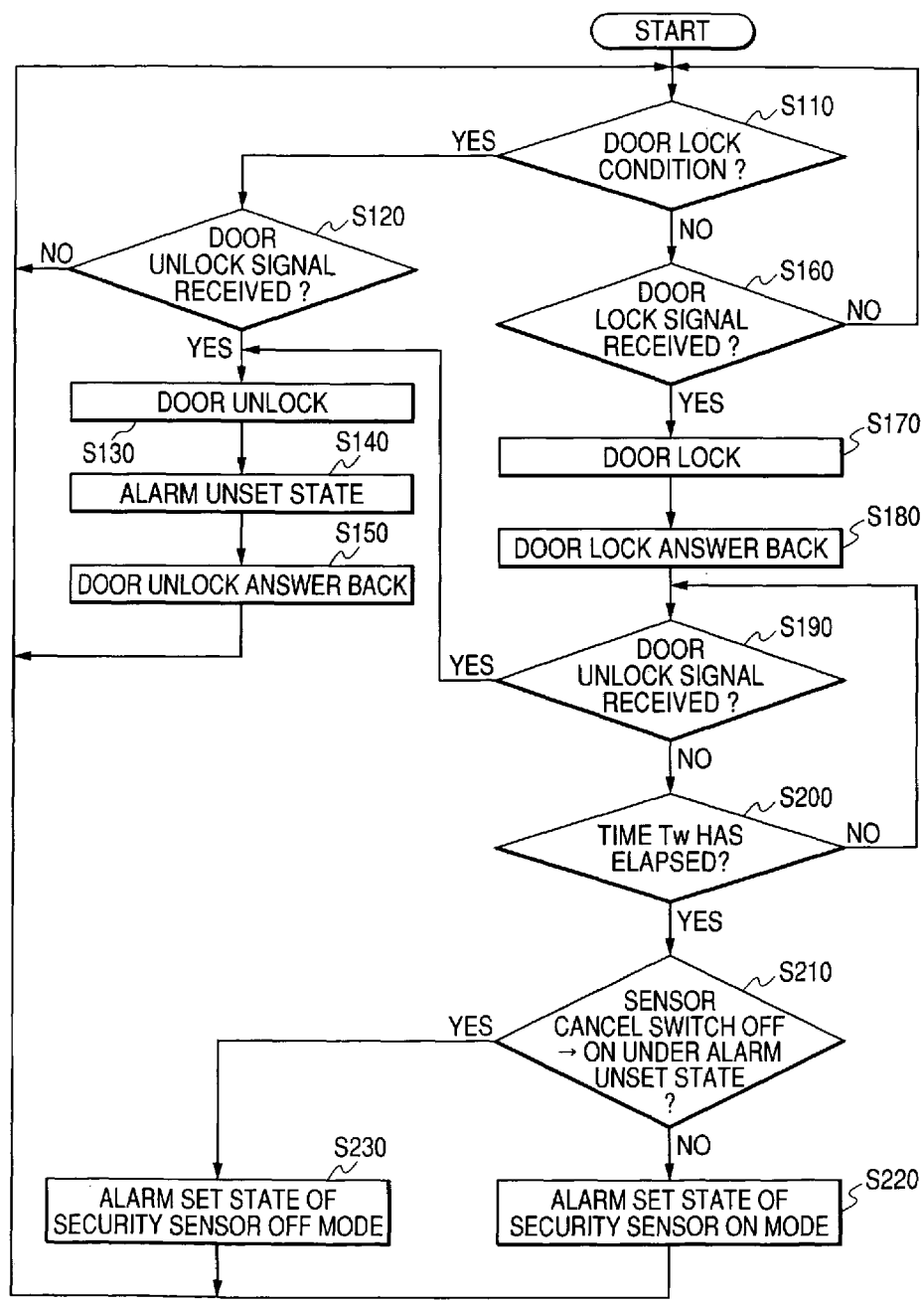

AUTOMOTIVE ANTITHEFT SYSTEM

CROSS-REFERENCE TO RELATED APPLICATION

This application is based upon and claims the benefit of priority from earlier Japanese Patent Application No. 2004-5782 filed on Jan. 13, 2004 so that the description of which is incorporated herein by reference.

BACKGROUND OF THE INVENTION

The present invention relates to an antitheft system capable of preventing an automotive vehicle from being stolen.

A conventionally known antitheft system (i.e. a security equipmet) for preventing an automotive vehicle from being stolen is arranged to receive signals from door switches detecting door open/close conditions, an ignition switch, or any other detectors provided for various purposes in an automotive vehicle and to generate an alarm by using a siren or a horn based on these signals when any unfair act of an unauthorized person to the automotive vehicle is detected, for example, when one of the doors is forcibly opened or an engine is started by an unauthorized person.

It is also known to use, in addition to such a fundamental arrangement, an ultrasonic or radio intrusion sensor for detecting any unauthorized person entering into a vehicle, a glass crack sensor for detecting a glass being broken, an inclination sensor for detecting an inclined vehicle body, an impact sensor for detecting any impact force applied on the automotive vehicle, or any other security sensor specialized to detect any unfair act of an unauthorized person to the automotive vehicle. For example, the Japanese Patent Application Laid-open No. 2003-95068 discloses a conventional system using such security sensors to detect any abnormality and generating alarm.

According to a burglar alarm unit equipped with this kind of security sensors, the burglar alarm unit can operate in an alarm set state for generating alarm, while selecting its operation mode between a security sensor ON mode and a security sensor OFF mode. The security sensor ON mode includes not only execution of alarm based on the security sensors but also execution of alarm based on the detectors other than the security sensors. The security sensor OFF mode includes prohibition of alarm based on the security sensors and execution of alarm based on only the detectors other than the security sensors.

More specifically, in general, this kind of burglar alarm unit performs an automotive door lock control, and switches its operation between an alarm set state and an alarm unset state (i.e. a condition generating no alarm) in response to lock/unlock of the door. For example, there is a specified waiting time (e.g. 30 seconds) from the locking of doors before the burglar alarm unit starts operating in the alarm set state. On the other hand, the operation mode of the burglar alarm unit is immediately switched to the alarm unset state upon unlocking the door. The burglar alarm unit also performs so-called answer back that includes a predetermined pattern of flickering by automotive hazard lamps to inform a user of execution of lock/unlock of the doors.

Furthermore, the burglar alarm unit goes into the alarm set state if a specific operation is made to invalidate the signal of the security sensor under the alarm unset state (for example, when a sensor cancel switch is turned on to deactivate the security sensor). In this case, the burglar alarm unit selects the alarm set state of security sensor OFF mode.

On the contrary, the burglar alarm unit may shift into the alarm set state without responding to the above-described specific operation under the alarm unset state. In such a case, the burglar alarm unit selects the alarm set state of security sensor ON mode.

The above-described procedures are mandatory as apparent from the Japanese Safety Standards (refer to safety standards, article 43(5)—detailed notification principles—article 54—appendix 63: technical standards relating to antitheft alarm devices 4.1.1). According to this regulation, cancellation of the security sensor signal (direct switching from the security sensor ON mode to the security sensor OFF mode) is not allowed under the alann set state. The regulation requires the antitheft alarm device to once shift into the alarm unset state before establishing the alarm set state of security sensor OFF mode. Similar regulations are present in the relevant laws of Europe (95/56/EC) or United Nations (BCE97).

On the other hand, the security sensor OFF mode can be used in the following situation. For example, when an intrusion sensor is installed as a security sensor of an automotive vehicle, a user may leave his/her pet in a compartment of the vehicle while bringing the burglar alarm unit into the alarm set state. In such a case, the security sensor OFF mode is preferable in that no erroneous alarm is generated in response the pet moving around in the automotive vehicle.

Furthermore, an inclination sensor or an impact sensor can be installed as a security sensor of the automotive vehicle. In such a case, the security sensor OFF mode is preferable in that no erroneous alarm is generated during transportation of automotive vehicles by a carferry which may frequently roll on the way to a destination.

According to the above-described burglar alarm unit equipped with such security sensors, a user may choose the alarm set state of security sensor OFF mode before he/she leaves the automotive vehicle. However, at a later timing, this user may change his/her mind and want the burglar alarm unit to operate in the alarm set state of the security sensor ON mode. In such a case, the user needs to return to his/her automotive vehicle to once release the alarm set state (i.e. shift into the alarm unset state as a first step). To this end, for example, the user unlocks the door. Then, as a succeeding step required for bringing the burglar alarm unit into the alarm set state, the user locks the door.

Similarly, a user may choose the alarm set state of security sensor ON mode before he/she leaves the automotive vehicle. However, at a later timing, this user may change his/her mind to cause the burglar alarm unit to operate in the alarm set state of the security sensor OFF mode. In such a case, the user needs to return to his/her automotive vehicle to once release the alarm set state (i.e. shift into the alarm unset state as a first step). Then, as a second step required for deactivating the security sensor, a specific operation (e.g. turning on a sensor cancel switch) needs to be done by the user. Finally, as a third step, the user is required to do a necessary operation for bringing the burglar alarm unit into the alarm set state.

SUMMARY OF THE INVENTION

In view of the above-described problems, the present invention has an object to provide an automotive antitheft system which can provide excellent usability.

In order to accomplish the above and other related objects, the present invention provides a first automotive antitheft system which includes a burglar alann unit installed in an automotive vehicle to generate an alarm in response to detection of any unfair act of an unauthorized person to the automotive vehicle, and a portable unit carried by a user of the automotive vehicle.

The burglar alarm unit includes a security sensor specifically detecting the unfair act of the unauthorized person to the automotive vehicle. The burglar alarm unit is arranged to operate in an alarm set state for generating alarm and also operate in an alarm unset state for generating no alarm. An operation mode of the burglar alarm unit in the alarm set state is switchable between a first mode and a second mode. The first mode of the burglar alarm unit, corresponding to the above-described 'security sensor ON mode', includes generating alarm in response to a detection signal of the security sensor detecting the unfair act of the unauthorized person to the automotive vehicle when the security sensor is active and also generating alarm in response to a detection result of a detector other than the security sensor provided in the automotive vehicle for detecting the unfair act of the unauthorized person to the automotive vehicle. The second mode of the burglar alarm unit, corresponding to the above-described 'security OFF mode', includes prohibiting any alarm based on the security sensor when the security sensor is invalidated and generating alarm in response to the detection result of the detector indicating the unfair act of the unauthorized person to the automotive vehicle.

More specifically, according to the above-described first automotive antitheft system, the portable unit transmits a first mode shift command signal for shifting the operation mode from the second mode to the first mode, directly or via an information center, to the burglar alarm unit of the automotive vehicle when a specific operation is done on the portable unit to shift the operation mode of the burglar alarm unit from the second mode to the first mode.

Then, the burglar alarm unit is arranged to once shift into the alarm unset state before shifting into the alarm set state with the operation mode being set to the first mode in response to the first mode shift command signal when received under the alarm set state with the operation mode being set to the second mode.

According to the first automotive antitheft system of the present invention, a user may leave the automotive vehicle under a condition that the burglar alarm unit operates in the alarm set state of second mode and at a later timing the user may change his/her mind to cause the burglar alarm unit to operate in the alarm set state of the first mode. In such a case, the user needs not to return to the automotive vehicle. The only thing required for the user is to make a specific operation on his/her portable unit to instruct shifting of the operation mode of the burglar alarm unit from the second mode to the first mode. Thus, the first automotive antitheft system of the present invention can improve the usability of the antitheft system.

Furthermore, the first automotive antitheft system of the present invention can fulfill the law requirements such that the operation mode of any burglar alarm unit must shift from the second mode to the first mode (i.e. change the security sensor from invalid state to valid state) after the burglar alarm unit once shifts into the alarm unset state.

As explained in the description of the technical background, this kind of burglar alarm unit is usually arranged to judge establishment of alarm set conditions in response to locking of automotive doors and shift into the alarm set state after a specified waiting time (e.g. 30 seconds) Tw has passed from such establishment of alarm set conditions. For example, if the burglar alarm unit immediately responds to locking of doors and shifts into the alarm set state, there will be a problem or inconvenience when someone still stays in the automotive vehicle and the user erroneously locks all doors before everybody goes out of the vehicle. Considering such drawbacks, it is necessary to provide the above-described waiting time Tw for allowing the user to once unlock the doors for the remaining passengers before the burglar alarm unit goes into the alarm set state.

On the other hand, when the burglar alarm unit responds to the first mode shift command signal and shifts according to the sequence of the alarm set state of second mode→the alarm unset state→the alarm set state of first mode, a user may be located far from the automotive vehicle and accordingly it is preferable from the view point of security that the burglar alarm unit immediately accomplishes this sequential shifting operation and goes into the alarm set state as quickly as possible because the burglar alarm unit was basically operating in the alarm set state. Providing a long period of time for the alarm unset state in such a sequential shifting operation will give an unauthorized person a chance to access the automotive vehicle and perform an unfair act.

In view of the above, according to the first automotive antitheft system of this invention, it is preferable that a time Ta required for the burglar alarm unit to shift into the alarm set state via the alarm unset state in response to the first mode shift command signal (i.e. a period of time during which the burglar alarm unit is operating in the alarm unset state) is shorter than a waiting time Tw required for the burglar alarm unit to wait until starting operation in the alarm set state from establishment of specific alarm set conditions under the alarm unset state.

Regarding the method for setting the relationship Ta<Tw, it is for example possible to intentionally provide a delay time Td between the timing the burglar alarm unit shifts into the alarm unset state in response to the first mode shift command signal and the timing the burglar alarm unit again shifts into the alarm set state. In this case, the delay time Td can be set to a value shorter than the above-described waiting time Tw. However, it is most preferable that such intentional delay time Td is not provided (i.e. Td=0 and the time Ta is just equal to the delay of processing).

On the other hand, as explained in the description of the technical background, this kind of burglar alarm unit not only executes the automotive door lock control but also executes switching between the alarm set state and the alarm unset state in response to lock/unlock of the doors. Furthermore, the burglar alarm unit executes the answer back in response to the lock/unlock of doors to inform it to a user by flickering hazard lamps or the like.

It may be possible, even when the burglar alarm unit responds to the first mode shift command signal and performs sequential shifting into the alarm unset state and to the alarm set state, that the burglar alarm unit sends the answer back by activating the electric load such as hazard lamp installed on the automotive vehicle. However, considering the situation that the user is not present in the vicinity of the automotive vehicle in this case, it is preferable that the burglar alarm unit is arranged to send the user no answer back including a predetermined activation of the electric load of the automotive vehicle when the burglar alarm unit successively shifts into the alarm unset state and into the alarm set state in response to the first mode shift command signal. In other words, this enables the burglar alarm unit to prevent any unauthorized person from knowing its alarm unset state in a case the user is located far from the automotive vehicle.

Furthermore, for the purpose of improving the security of an automotive vehicle, it is preferable that the burglar alarm unit is arranged to perform no unlock operation of the doors when the burglar alarm unit shifts into the alarm unset state in response to the first mode shift command signal.

The present invention provides a second automotive antitheft system including a burglar alarm unit installed in an automotive vehicle to generate alarm in response to detection of any unfair act of an unauthorized person to the automotive vehicle, and a portable unit carried by a user of the automotive vehicle, wherein the burglar alarm unit includes a security sensor specifically detecting the unfair act of the unauthorized person to the automotive vehicle. The burglar alarm unit is arranged to operate in an alarm set state for generating alarm and also operate in an alarm unset state for generating no alarm. An operation mode of the burglar alarm unit in the alarm set state is switchable between a first mode and a second mode.

The first mode of the burglar alarm unit includes generating alarm in response to a detection signal of the security sensor detecting the unfair act of the unauthorized person to the automotive vehicle when the security sensor is active and also generating alarm in response to a detection result of a detector other than the security sensor provided in the automotive vehicle for detecting the unfair act of the unauthorized person to the automotive vehicle. The second mode of the burglar alarm unit includes prohibiting any alarm based on the security sensor when the security sensor is invalidated and generating alarm in response to the detection result of the detector indicating the unfair act of the unauthorized person to the automotive vehicle.

According to the second automotive antitheft system, the portable unit transmits a second mode shift command signal for shifting the operation mode from the first mode to the second mode, directly or via an information center, to the burglar alarm unit of the automotive vehicle when a specific operation is done on the portable unit to shift the operation mode of the burglar alarm unit from the first mode to the second mode.

And, the burglar alarm unit is arranged to once shift into the alarm unset state before shifting into the alarm set state with the operation mode being set to the second mode in response to the second mode shift command signal when received under the alarm set state with the operation mode being set to the first mode.

According to the second automotive antitheft system of the present invention, a user may leave the automotive vehicle under a condition that the burglar alarm unit operates in the alarm set state of first mode and at a later timing the user may change his/her mind to cause the burglar alarm unit to operate in the alarm set state of second mode. In such a case, the user needs not to return to the automotive vehicle. The only thing required for the user is to make a specific operation on his/her portable unit to instruct shifting of the operation mode of the burglar alarm unit from the first mode to the second mode. Thus, the usability of the antitheft system can be improved. Furthermore, the second automotive antitheft system of the present invention can fulfill the law requirements such that the operation mode of any burglar alarm unit must shift from the first mode to the second mode (i.e. an active security sensor must be deactivated) after the burglar alarm unit once shifts into the alarm unset state.

Like the above-described second automotive antitheft system, it is preferable in the first automotive antitheft system that the portable unit transmits a second mode shift command signal for shifting the operation mode from the first mode to the second mode, directly or via an information center, to the burglar alarm unit of the automotive vehicle when a specific operation is done on the portable unit to shift the operation mode of the burglar alarm unit from the first mode to the second mode. And, the burglar alarm unit is arranged to once shift into the alarm unset state before shifting into the alarm set state with the operation mode being set to the second mode in response to the second mode shift command signal when received under the alarm set state with the operation mode being set to the first mode.

Furthermore, according to the second automotive antitheft system, it is preferable that a time Tb required for the burglar alarm unit to shift into the alarm set state via the alarm unset state in response to the second mode shift command signal (i.e. a period of time during which the burglar alarm unit is operating in the alarm unset state) is shorter than a waiting time Tw required for the burglar alarm unit to wait until starting operation in the alarm set state from establishment of specific alarm set conditions under the alarm unset state. The time Tb equal to or close to 0 is preferable. Providing a longer waiting time Tb will undesirably give an unauthorized person a chance to access the automotive vehicle and make unfair act.

Regarding the method for setting the relationship Tb<Tw, it is for example possible to intentionally provide a delay time Td between the timing the burglar alarm unit shifts into the alarm unset state in response to the second mode shift command signal and the timing the burglar alarm unit again shifts into the alarm set state. In this case, the delay time Td can be set to a value shorter than the above-described waiting time Tw. However, it is most preferable that such intentional delay time Td is not provided (i.e. Td=0 and the time Tb is just equal to the delay of processing).

Furthermore, according to the second automotive antitheft system, it is preferable that the burglar alarm unit is arranged to send the user no answer back including a predetermined activation of the electric load of the automotive vehicle when the burglar alarm unit successively shifts into the alarm unset state and into the alarm set state in response to the second mode shift command signal. In other words, this enables the burglar alarm unit to prevent any unauthorized person from knowing its alarm unset state in a case the user is located far from the automotive vehicle.

Furthermore, for the purpose of improving the security of an automotive vehicle, it is preferable in the second antitheft system that the burglar alarm unit is arranged to perform no unlock operation of the doors when the burglar alarm unit shifts into the alarm unset state in response to the second mode shift command signal.

The present invention provides a third automotive antitheft system which is similar to the first automotive antitheft system in the fundamental arrangement of the burglar alarm unit and in that the portable unit transmits a first mode shift command signal for shifting the operation mode from the second mode to the first mode, directly or via an information center, to the burglar alarm unit of the automotive vehicle when a specific operation is done on the portable unit to shift the operation mode of the burglar alarm unit from the second mode to the first mode.

However, the third automotive antitheft system is different from the first automotive antitheft system in that the burglar alarm unit shifts the operation mode from the second mode to the first mode, while maintaining the alarm set state unchanged, in response to the first mode shift command signal when received under the alarm set state with the operation mode being set to the second mode.

Like the above-described first automotive antitheft system, the third automotive antitheft system of the present invention can provide excellent usability and also assure excellent security because the burglar alarm unit never goes into the alarm unset state when the operation mode of the burglar alarm unit is switched from the second mode to the first mode by a remote control done by the user.

On the other hand, the present invention provides a fourth automotive antitheft system which is similar to the second automotive antitheft system in the fundamental arrangement of the burglar alarm unit and in that the portable unit transmits a second mode shift command signal for shifting the operation mode from the first mode to the second mode, directly or via an information center, to the burglar alarm unit of the automotive vehicle when a specific operation is done on the portable unit to shift the operation mode of the burglar alarm unit from the first mode to the second mode.

However, the fourth automotive antitheft system is different from the second automotive antitheft system in that the burglar alarm unit shifts the operation mode from the first mode to the second mode, while maintaining the alarm set state unchanged, in response to the second mode shift command signal when received under the alarm set state with the operation mode being set to the first mode.

Like the above-described second automotive antitheft system, the fourth automotive antitheft system of the present invention can provide excellent usability and also assure excellent security because the burglar alarm unit never goes into the alarm unset state when the operation mode of the burglar alarm unit is switched from the first mode to the second mode by a remote control done by the user.

Furthermore, according to the third automotive antitheft system, it is preferable that the portable unit transmits a second mode shift command signal for shifting the operation mode from the first mode to the second mode, directly or via an information center, to the burglar alarm unit of the automotive vehicle when a specific operation is done on the portable unit to shift the operation mode of the burglar alarm unit from the first mode to the second mode. And, the burglar alarm unit shifts the operation mode from the first mode to the second mode, while maintaining the alarm set state unchanged, in response to the second mode shift command signal when received under the alarm set state with the operation mode being set to the first mode.

BRIEF DESCRIPTION OF THE DRAWINGS

The above and other objects, features and advantages of the present invention will become more apparent from the following detailed description which is to be read in conjunction with the accompanying drawings, in which:

FIG. 2 is a flowchart of the main processing executed by a controller of the burglar alarm unit in accordance with a first embodiment of the present invention;

DESCRIPTION OF THE PREFERRED EMBODIMENTS

Preferred embodiments of the present invention will be explained hereinafter with reference to attached drawings.

First Embodiment

Figure 1:
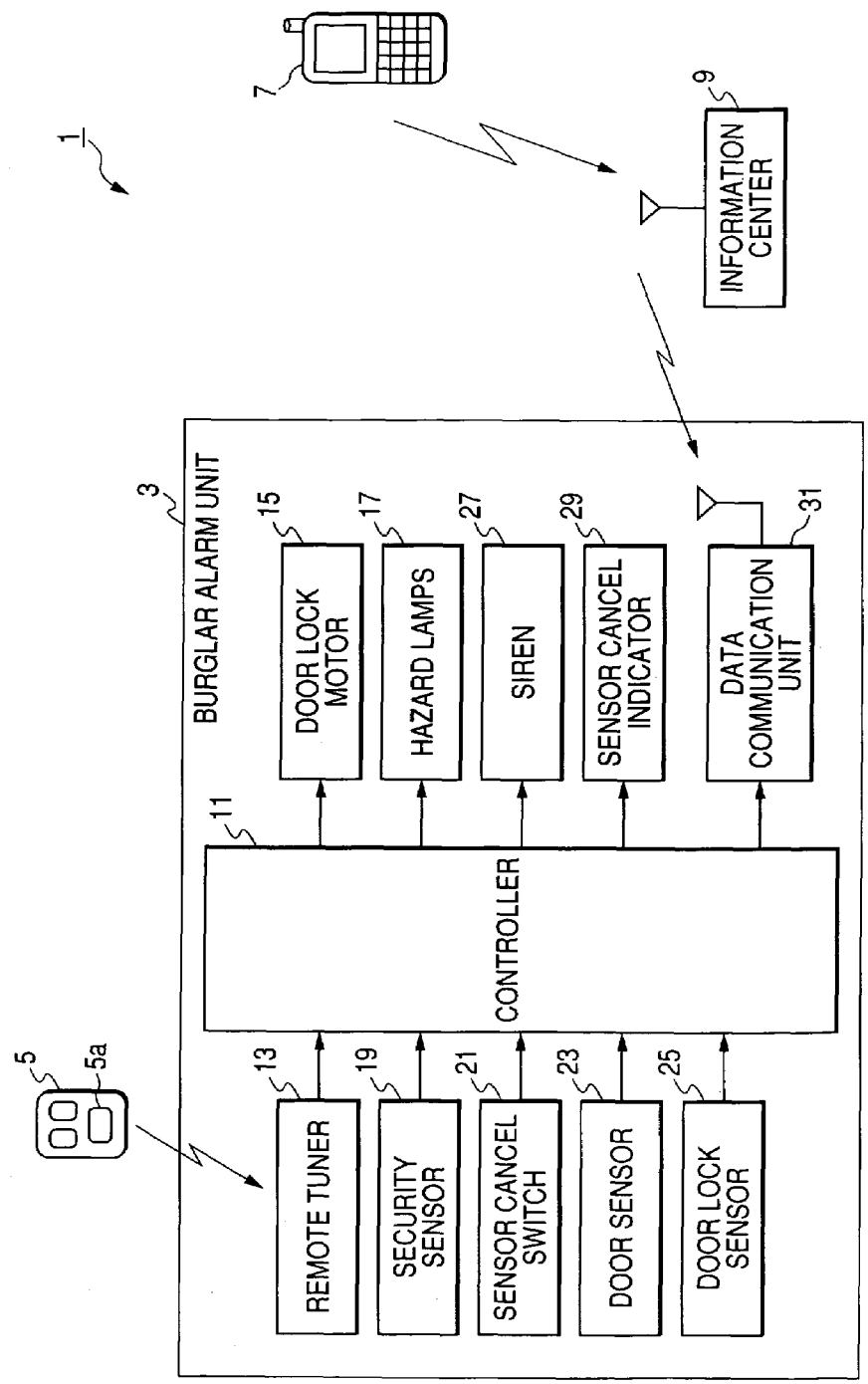
FIG. 1 is a diagram showing the arrangement of an automotive antitheft system in accordance with a first embodiment of the present invention.

Hereinafter, an automotive antitheft system in accordance with a preferred embodiment of the present invention will be explained. FIG. 1 is a diagram showing the arrangement of an automotive antitheft system 1 in accordance with a first embodiment of the present invention. As shown in FIG. 1, the antitheft system 1 of the first embodiment includes a burglar alarm unit 3 installed on an automotive vehicle and a portable unit, such as a key less remote controller 5 and a portable phone 7, carried by a user of this automotive vehicle. Furthermore, the antitheft system 1 includes an information center 9 located far from this automotive vehicle. This information center 9 has a wide communication area covering a plurality of automotive burglar alarm units 3.

The keyless remote controller 5 transmits by wireless a signal requesting a door lock/unlock control when the user depresses a button 5a. The burglar alarm unit 3 includes a controller 11 arranged chiefly by a microcomputer. The controller 11 is connected to a remote tuner 13, a door lock motor 15, automotive hazard lamps 17, a security sensor (e.g. intrusion sensor according to this embodiment) 19 of an ultrasonic type, a sensor cancel switch 21, a door sensor 23, a door lock sensor 25, a siren (i.e. acoustic alarm device) 27, a sensor cancel indicator 29 consisting of a light emitting diode, and a data communication unit 31. The remote tuner 13 performs radio communication with the keyless remote controller 5. The door lock motor 15 is used to lock and unlock the doors of the automotive vehicle. The security sensor 19 detects intrusion of a person entering into the compartment of the automotive vehicle. The sensor cancel switch 21 cancels the function of the security sensor 19. The door sensor 23 detects open/close conditions of the doors. The door lock sensor 25 detects lock/unlock conditions of the doors. The siren 27 generates alarm toward the outside to notify the presence of any unfair act of an unauthorized person to the automotive vehicle. The sensor cancel indicator 29 indicates turning on of the sensor cancel switch 21. The data communication unit 31 performs data communication with the portable phone 7 via the information center 9. The controller 11 not only performs automotive door lock control but also performs automotive vehicle antitheft control.

Next, the processing performed by the controller 11 will be explained with reference to attached flowcharts. FIG. 2 is a flowchart showing the main processing executed by the controller 11 when the automotive vehicle is in a stopped condition and all of the automotive doors are closed.

After starting the main processing, the controller 11 executes step S110 to make a judgment based on the signal of door lock sensor 25 whether or not the doors are locked (i.e. whether or not the doors are in the door lock condition). In this case, instead of detecting the lock condition of all doors, it is possible to detect the lock condition of only one door near a driver's seat.

When the door lock condition is detected in the above-described step S110 (i.e. YES in step S110), the controller 11 proceeds to step S120 to make a judgment as to whether or not a signal (i.e. a door unlock signal in this case) is received from the keyless remote controller 5. If no door unlock signal is received from the keyless remote controller 5 (i.e. NO in step S120), the controller 11 returns to the step S110.

On the other hand, when the signal (i.e. the door unlock signal) is received from the keyless remote controller 5 (i.e. YES in step S120), the controller 11 proceeds to step S130 to activate the door lock motor 15 to unlock all doors. Then, in the succeeding step S140, the controller 11 prohibits the siren 27 from generating alarm. Namely, the burglar alarm unit 3 is brought into the alarm unset state. Furthermore, in the succeeding step S150, the controller 11 causes the hazard lamps 17 to flicker, for example two times, to send the answer back informing accomplishment of door unlock. Subsequently, the controller 11 returns to the step S110. The user, when receives this answer back, can know the execution of door unlock and confirm the condition that the burglar alarm unit 3 is in the alarm unset state.

On the other hand, when the door lock condition is not detected in the above-described step S110 (i.e. NO in step S110), the controller 11 proceeds to step S160 to make a judgment as to whether or not a signal (i.e. a door lock signal in this case) is received from the keyless remote controller 5. If the door lock signal is not received from the keyless remote controller 5 (i.e. NO in step S160), the controller 11 returns to the above-described step S110.

On the other hand, when the signal (i.e. the door lock signal) is received from the keyless remote controller 5 (i.e. YES in step S160), the controller 11 proceeds to step S170 to activate the door lock motor 15 to lock all doors. Then, in the succeeding step S180, the controller 11 causes the hazard lamps 17 to flicker, for example one time, to send the answer back informing accomplishment of door lock. The user, when receives this answer back, can know the execution of door lock.

Then, the controller 11 proceeds to the succeeding step S190 to make a judgment as to whether or not a signal (i.e. a door unlock signal in this case) is received from the keyless remote controller 5. If the door unlock signal is received from the keyless remote controller 5 (i.e. YES in step S190), the controller 11 proceeds to the previously described step S130.

On the other hand, when no unlock signal is received from the keyless remote controller 5 (i.e. NO in step S190), the controller 11 proceeds to step S200 to further make a judgment as to whether or not a specified time Tw (e.g. 30 seconds) has elapsed since execution of door lock in the above-described step S170.

When the specified time Tw has not yet elapsed (i.e. NO in step S200), the controller 11 returns to the above-described step S190. On the other hand, when the specified time Tw has already elapsed (i.e. YES in step S200), the controller 11 proceeds to step S210 to further make a judgment as to whether or not the sensor cancel switch 21 is turned on (i.e. OFF→ON) under the alarm unset state. When the sensor cancel switch 21 is not turned on (i.e. NO in step S210), the controller 11 proceeds to step S220 to bring the burglar alarm unit 3 into the alarm set state of security sensor ON mode. Subsequently, the controller 11 returns to the step S110. According to this embodiment, when the sensor cancel switch 21 is turned on under a condition that the burglar alarm unit 3 is in the alarm unset state, a memory incorporated in the controller 11 stores historical information indicating this fact. Accordingly, in the step S210, the controller 11 reads the historical information out of the memory and makes a judgment based on the readout information as to whether or not the sensor cancel switch 21 is turned on under the alarm unset state.

Furthermore, when the sensor cancel switch 21 is turned on under the alarm unset state (i.e. YES in step S210), the controller 11 proceeds to step S230 to bring the burglar alarm unit 3 into the alarm set state of security sensor OFF mode. Subsequently, the controller 11 returns to the step S110.

Figure 3A:
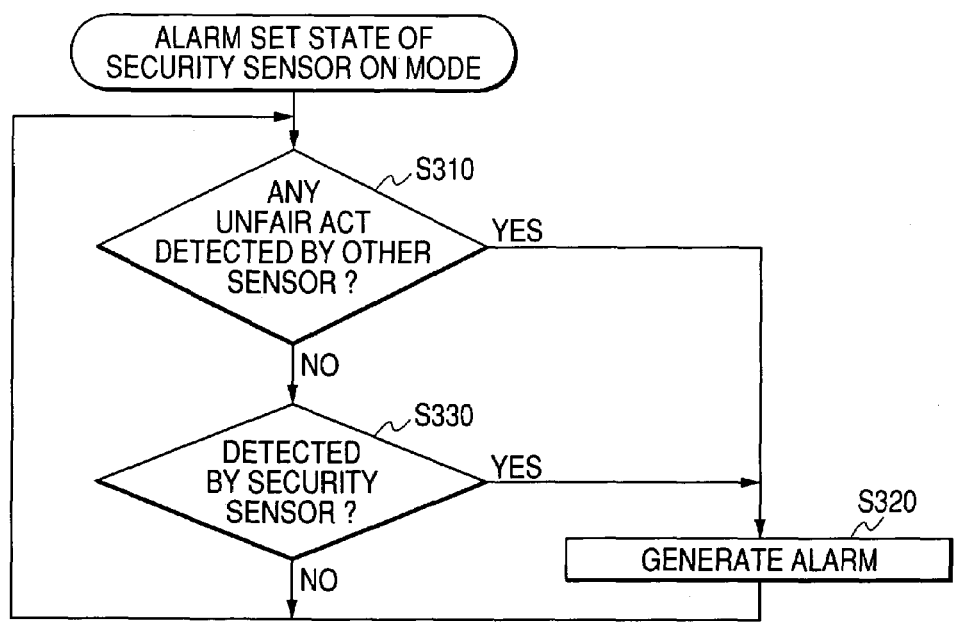
FIGS. 3A and 3B are flowcharts of the processing executed by the controller of the burglar alarm unit in accordance with the first embodiment of the present invention.

When the burglar alarm unit 3 is brought into the alarm set state of security sensor ON mode (i.e. the condition of step S220), the controller 11 proceeds to step S310 shown in FIG. 3A to check based on the signals of the door sensor 23 and the door lock sensor 25 as to whether or not any unfair act to the automotive vehicle is done by an unauthorized person. More specifically, if opening of any door (i.e. forcible opening of the doors) is detected based on the signal of door sensor 23 even under a condition that all of the doors are locked in the step S170 of FIG. 2, or if a change into door unlock condition (i.e. unauthorized door unlock) is detected based on the signal of door lock sensor 25, the controller 11 identifies the presence of any unfair act. When any unfair act is detected (i.e. YES in step S310), the controller 11 proceeds to step S320 to cause the siren 27 to generate alarm.

On the other hand, when no unfair act is detected (i.e. NO in S310), the controller 11 proceeds to step S330 to make a judgment as to whether or not any intrusion of a mankind into a compartment is detected by the security sensor 19. When no intrusion of a mankind is detected by the security sensor 19 (i.e. NO in S330), the controller 11 returns to the step S310. When any intrusion of a mankind is detected by the security sensor 19 (i.e. YES in S330), the controller 11 proceeds to step S320 to cause the siren 27 to generate alarm.

In other words, when the burglar alarm unit 3 is in the alarm set state of security sensor ON mode, the controller 11 carries out both an alarming operation based on the security sensor 19 and an alarming operation based on the sensors 23 and 25 other than the security sensor 19.

Figure 3B:
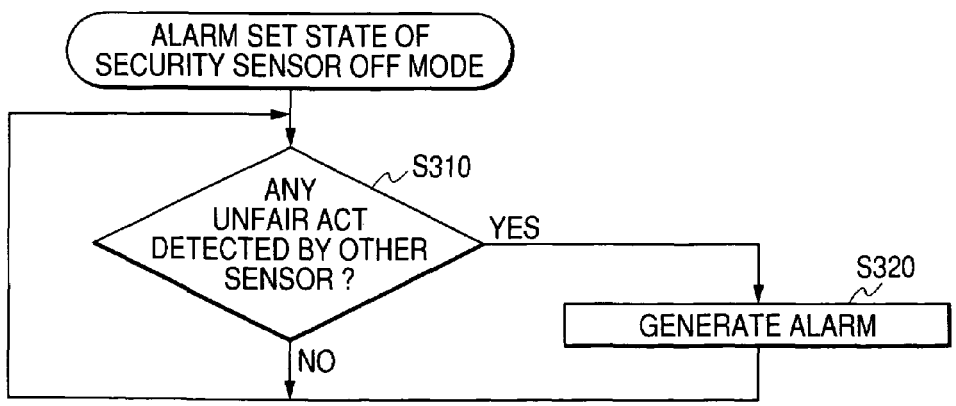

On the other hand, when the burglar alarm unit 3 is in the alarm set state of security sensor OFF mode (i.e. the condition of step S230), the controller 11 executes the processing of FIG. 3B according to which the controller 11 skips the processing of step S330 provided in the flowchart of FIG. 3A. In other words, when the burglar alarm unit 3 is in the alarm set state of security sensor OFF mode, the controller 11 cancels the signal of security sensor 19 and carries out no alarming operation based on the security sensor 19.

As apparent from the flowcharts of FIG. 2 and FIGS. 3A and 3B, when the user depresses the button 5a of the keyless remote controller 5 under a condition that automotive doors are locked, the remote tuner 13 receives the signal sent from the keyless remote controller 5. The controller 11 unlocks the doors (refer to step S130) and at the same time brings the burglar alarm unit 3 into the alarm unset state (refer to step S140), and then causes the hazard lamps 17 to flicker for the answer back informing accomplishment of door unlock (refer to step S150).

On the other hand, when the user depresses the button 5a of the keyless remote controller 5 under a condition that automotive doors are unlocked, the remote tuner 13 receives the signal sent from the keyless remote controller 5. The controller 11 locks the doors (refer to step S170) and then causes hazard lamps 17 to flicker for the answer back informing accomplishment of door lock (refer to step S180). Then, if no signal is received from the keyless remote controller 5 within the specified time Tw (i.e. YES in step S200), the burglar alarm unit 3 goes into the alarm set state for causing the siren 27 to generate alarm in case of detection of any unfair act of an unauthorized person to the automotive vehicle. If the sensor cancel switch 21 is turned on under the alarm unset state (i.e. YES in S210), the burglar alarm unit 3 selects the alarm set state of security sensor OFF mode (refer to step S230). If the sensor cancel switch 21 is not turned on under the alarm unset state (i.e. NO in step S210), the burglar alarm unit 3 selects the alarm set state of security sensor ON mode (refer to step S220).

On the other hand, when the user depresses the button 5a of keyless remote controller 5 and the remote tuner 13 receives the signal sent from the keyless remote controller 5 before the above-described specified time Tw has elapsed since execution of door lock, i.e. before the burglar alarm unit 3 goes into the alarm set state (YES in step S190), the controller 11 unlocks the doors without bringing the burglar alarm unit 3 into the alarm set state (refer to step S130) and causes the hazard lamps 17 to flicker for the answer back informing accomplishment of door unlock (refer to step S150). According to this embodiment, when a user erroneously operates the keyless remote controller 5 to lock the doors although someone stays in the compartment of the vehicle, the user is given the specified time Tw for correcting the input to the keyless remote controller 5 so that the door for the remaining person can be unlocked. During the specified time Tw, the burglar alarm unit 3 does not go into the alarm set state of security sensor ON mode. Thus, this embodiment surely prevents the siren 27 from generating erroneous alarm in response to the signal of security sensor 19 which detects the person remaining, in the compartment in this case.

If the controller 11 of the burglar alarm unit 3 performs only the processing shown in FIG. 2 and FIGS. 3A and 3B, there will be the following inconvenience.

Namely, when a user leaves an automotive vehicle under a condition that the burglar alarm unit 3 is in the alarm set state of security sensor OFF mode, the user may change his/her mind at a later timing to cause the burglar alarm unit 3 to operate in the alarm set state of security sensor ON mode. In such a case, the user must return to an accessible area by radio in which the keyless remote controller 5 can transmit a radio signal to the automotive vehicle. Then, as a first step, the user makes a predetermined operation on the keyless remote controller 5 which is required to unlock the doors (i.e. to bring the burglar alarm unit 3 into the alarm unset state). Subsequently, as a second step, the user makes additional operation on the keyless remote controller 5 which is required to lock the doors (i.e. to bring the burglar alarm unit 3 again into the alarm set state). These sequential first and second steps are inconvenient, troublesome, and time-consuming for the user.

Similarly, when a user leaves an automotive vehicle under a condition that the burglar alarm unit 3 operates in the alarm set state of security sensor ON mode, the user may change his/her mind at a later timing to cause the burglar alarm unit 3 to operate in the alarm set state of security sensor OFF mode. In such a case, the user must return to the accessible area by radio in the vicinity of the automotive vehicle. Then, as a first step, the user makes a predetermined operation on the keyless remote controller 5 which is required to unlock the doors (i.e. to bring the burglar alarm unit 3 into the alarm unset state). Then, as a second step, the user makes an ON operation for turning on the sensor cancel switch 21 to cancel the signal of security sensor 19. Finally, as a third step, the user makes additional operation on the keyless remote controller 5 which is required to lock the doors (i.e. to bring the burglar alarm unit 3 again into the alarm set state). These sequential first to third steps are inconvenient, troublesome, and time-consuming for the user.

Figure 4:
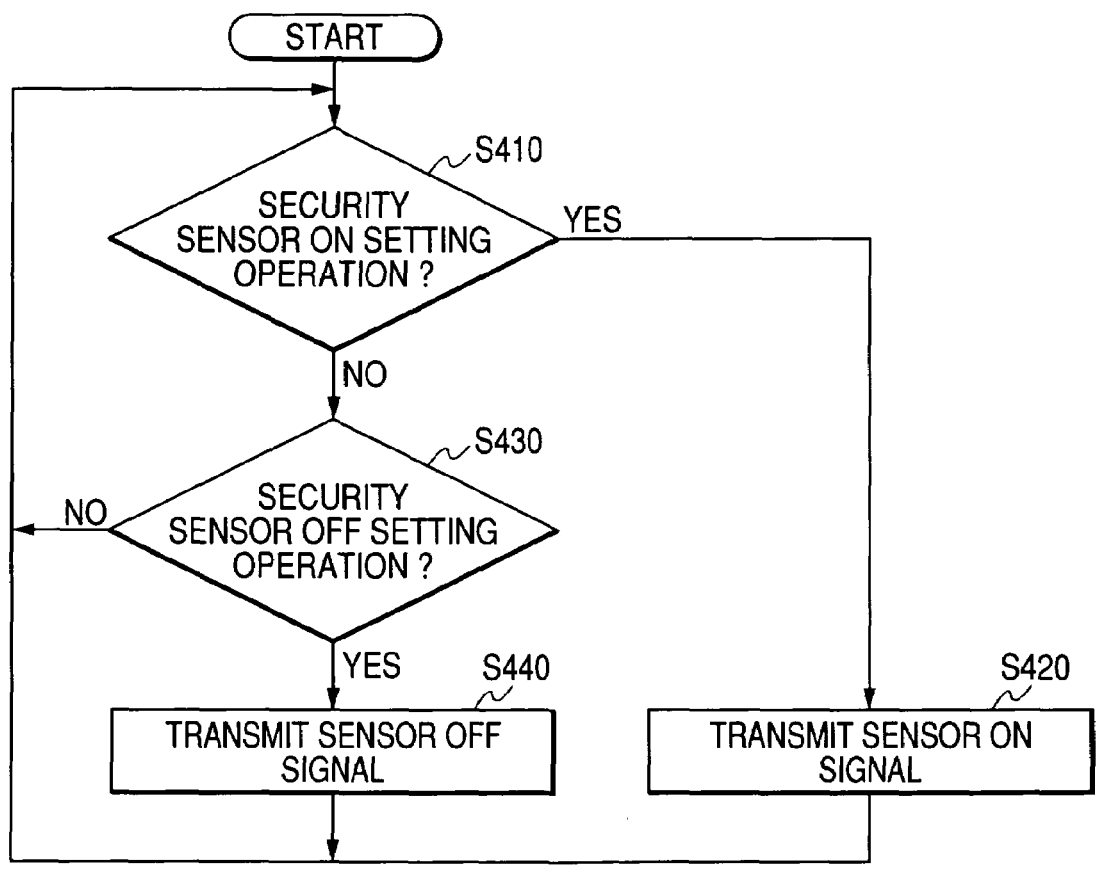
FIG. 4 is a flowchart of the processing executed by a portable phone in accordance with the first embodiment of the present invention.
Figure 5A:
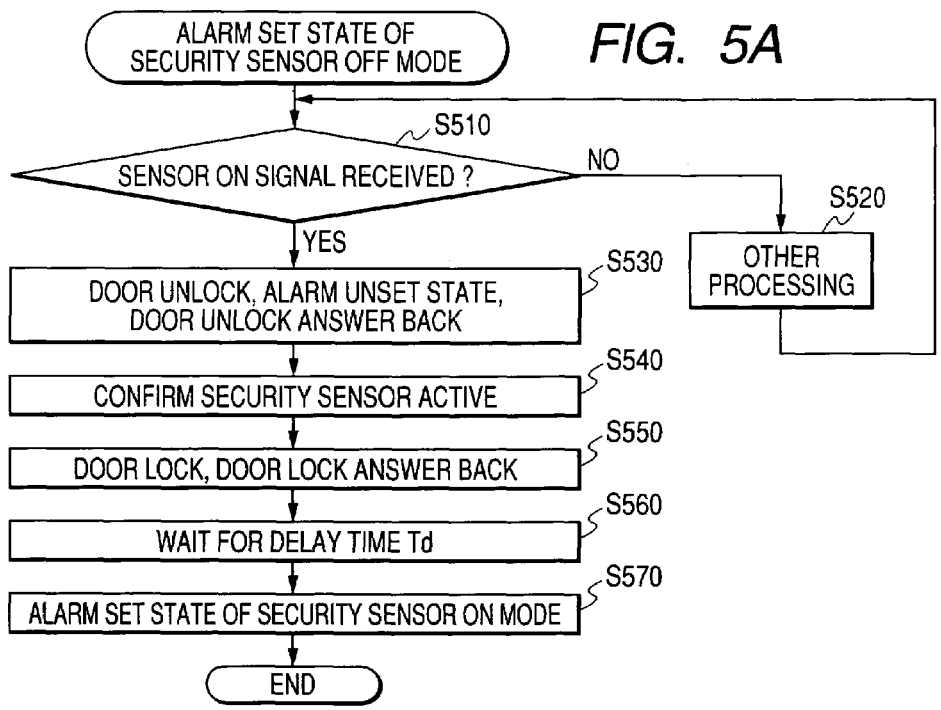
FIGS. 5A and 5B are flowcharts of the processing executed by the controller of the burglar alarm unit in accordance with the first embodiment of the present invention, to shift the operation mode in response to each of a sensor ON signal and a sensor OFF signal.
Figure 5B:
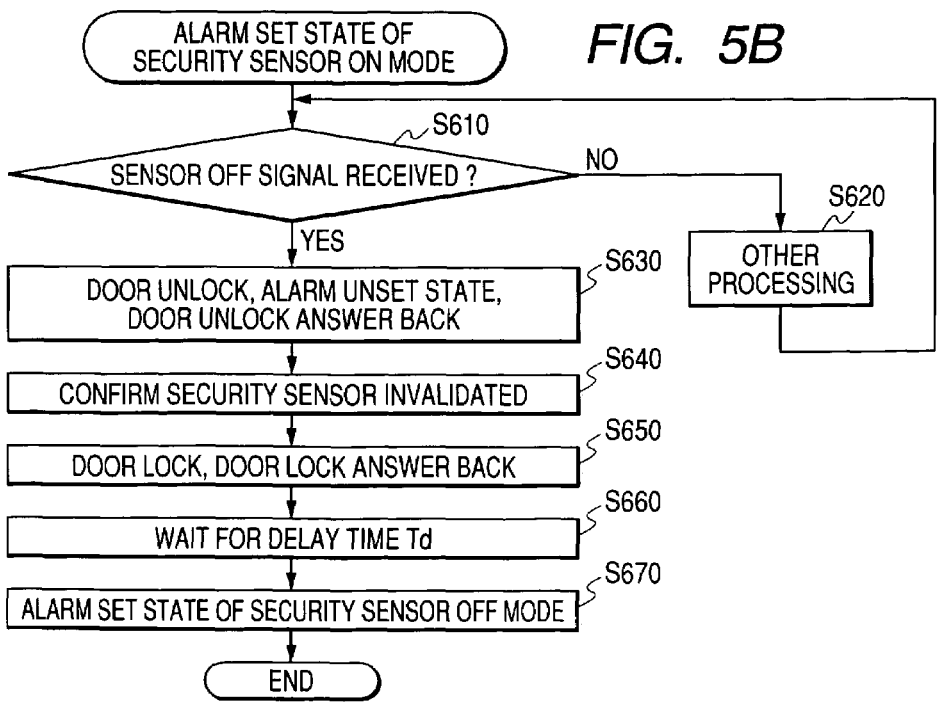

Considering the above drawbacks, the antitheft system 1 of the first embodiment is arranged to eliminate the above-described inconveniences by causing the portable phone 7 to execute the processing of FIG. 4 and also causing the controller 11 of the burglar alarm unit 3 to execute the processing shown in FIGS. 5A and 5B.

First, as shown in FIG. 4, the portable phone 7 makes a judgment as to whether or not there is an ON setting operation for validating the signal of security sensor 19 (refer to step S410). When there is an ON setting operation (i.e. YES in step S410), the portable phone 7 transmits a sensor ON signal (refer to step S420). On the other hand, when there is no ON setting operation (i.e. NO in step S410), the portable phone 7 further makes a judgment as to whether or not there is an OFF setting operation for invalidating the signal of security sensor 19 (refer to step S430). When there is an OFF setting operation (i.e. YES in step S430), the portable phone 7 transmits a sensor OFF signal (refer to step S440). When there is no OFF setting operation (i.e. NO in step S430), the processing restarts from the beginning. In practice, the above-described processing can be carried out by a microcomputer or a comparable information processing unit incorporated in the portable phone 7.

The sensor ON signal or the sensor OFF signal transmitted from the portable phone 7 arrives at the information center 9, and the information center 9 delivers this signal everywhere within the communication area of this information center 9. Accordingly, if the automotive vehicle installing the burglar alarm unit 3 is present in the communication area of information center 9, the data communication unit 31 of the burglar alarm unit 3 will receive the sensor ON signal or the sensor OFF signal transmitted from the portable phone 7.

In this embodiment, the 'ON setting operation' is an operation for shifting the operation mode of burglar alarm unit 3 from the security sensor OFF mode to the security sensor ON mode under the alarm set state. For example, a user depresses some specific keys on the portable phone 7 in a predetermined order for making this ON setting operation. Furthermore, the 'OFF setting operation' is an operation for shifting the operation mode of burglar alarm unit 3 from the security sensor ON mode to the security sensor OFF mode under the alarm set state. For example, like the ON setting operation, a user depresses some specific keys on the portable phone 7 in a predetermined order for making this OFF setting operation.

Next, when the burglar alarm unit 3 is in the alarm set state of security sensor OFF mode, the controller 11 provided in the burglar alarm unit 3 executes the processing of FIG. 5A in addition to the processing of FIG. 3B. First, the controller 11 executes step S510 to make a judgment as to whether or not the sensor ON signal is received. When the sensor ON signal is received (i.e. YES in step S510), the controller 11 proceeds to step S530 to activate the door lock motor 15 to unlock all doors and brings the burglar alarm unit 3 into the alarm unset state, and also causes the hazard lamps 17 to flicker for the answer back informing accomplishment of door unlock.

Then, in the next step S540, the controller 11 recognizes that ON operation of the sensor cancel switch 21 for invalidating the signal of security sensor 19 is not done. Next, in step S550, the controller 11 activates the door lock motor 15 to lock all doors and causes the hazard lamps 17 to flicker for the answer back informing accomplishment of door lock. Then, in step S560, the controller 11 waits for a predetermined delay time Td and, in the succeeding step S570, brings the burglar alarm unit 3 into the alarm set state of security sensor ON mode.

On the other hand, when the sensor ON signal is not received (i.e. NO in step S510), the controller 11 proceeds to step S520 to execute other processing and then returns to the step S510.

Furthermore, the controller 11 of the burglar alarm unit 3 executes the processing of FIG. 5B in addition to the processing of FIG. 3A.

First, the controller 11 executes step S610 to make a judgment as to whether or not the sensor OFF signal is received. When the sensor OFF signal is received (i.e. YES in step S610), the controller 11 proceeds to step S630 to activate the door lock motor 15 to unlock all doors and brings the burglar alarm unit 3 into the alarm unset state, and also cause the hazard lamps 17 to flicker for the answer back informing accomplishment of door unlock.

Then, in the next step S640, the controller 11 recognizes that ON operation of the sensor cancel switch 21 for invalidating the signal of security sensor 19 is done. Next, in step S650, the controller 11 activates the door lock motor 15 to lock all doors and causes the hazard lamps 17 to flicker for the answer back informing accomplishment of door lock. Then, in step S660, the controller 11 waits for the predetermined delay time Td and, in the succeeding step S670, brings the burglar alarm unit 3 into the alarm set state of security sensor OFF mode.

Furthermore, when the sensor OFF signal is not received (i.e. NO in step S610), the controller 11 proceeds to step S620 to execute other processing and then returns to the step S610.

The above-described antitheft system 1 according to the first embodiment operates in the following manner. A user may leave his/her automotive vehicle under a condition that the burglar alarm unit 3 is in the alarm set state of security sensor OFF mode, and at a later timing the user may change his/her mind to cause the burglar alarm unit to operate in the alarm set state of security sensor ON mode. In such a case, the user needs not to return to the automotive vehicle. Only the thing required for the user is to make the above-described ON setting operation on his/her portable phone 7. The portable phone 7 transmits the sensor ON signal to the burglar alarm unit 3 via the information center 9. The controller 11 of the burglar alarm unit 3 executes the processing of steps S530 to S570 shown in FIG. 5A.

On the other hand, the user may leave his/her automotive vehicle under a condition that the burglar alarm unit 3 is in the alarm set state of security sensor ON mode, and at a later timing the user may change his/her mind to cause the burglar alarm unit to operate in the alarm set state of security sensor OFF mode. In such a case, the user needs not to return to the automotive vehicle. Only the thing required for the user is to make the above-described OFF setting operation on his/her portable phone 7. The portable phone 7 transmits the sensor OFF signal to the burglar alarm unit 3 via the information center 9. The controller 11 of the burglar alarm unit 3 executes the processing of steps S630 to S670 shown in FIG. 5B. Thus, the above-described first embodiment can improve the usability of the antitheft system.

Furthermore, the antitheft system 1 according to the first embodiment can fulfill the law requirements such that the operation mode of the burglar alarm unit 3 must once shift into the alarm unset state when the operation mode of the burglar alarm unit 3 is shifted from the security sensor ON mode to the security sensor OFF mode or vice versa under the alarm set state.

According to the above-described first embodiment, the controller 11 of the burglar alarm unit 3 waits for the delay time Td in the step S560 in FIG. 5A and also in the step S660 in FIG. 5B. Thus, in the switching process of the operation mode of the burglar alarm unit 3 under the alarm set state, the burglar alarm unit 3 is surely brought into the alarm unset state for a significant time equivalent to the delay time Td. For example, the delay time Td is set to be equal to the specified time Tw used in the judgment step S200 of FIG. 2.

In general, a user will not be present in the vicinity of his/her automotive vehicle when the processing of steps S530 to S570 shown in FIG. 5A or the processing of steps S630 to S670 shown in FIG. 5B is executed by the controller 11. Accordingly, in view of the security of automotive vehicle, it is desirable to determine the above-described delay time Td as short as possible. Providing a longer period of time for the waiting time Tb will undesirably give an unauthorized person a chance to access the automotive vehicle and make unfair act.

Considering the above, it is desirable that the delay time Td is shorter than the specified time Tw. However, if allowable, it is most preferable that such intentional delay time Td is not provided (i.e. Td=0 and the processing in steps S560 and S660 is removed). The same thing is applied to the later-described embodiments.

In the above-described first embodiment, the security sensor ON mode corresponds to the first mode of the present invention and the security sensor OFF mode corresponds to the second mode of the present invention. Furthermore, the sensor ON signal corresponds to the first mode shift command signal of the present invention and the sensor OFF signal corresponds to the second mode shift command signal of the present invention. Moreover, the portable phone 7 corresponds to the portable unit of the present invention and both the door sensor 23 and the door lock sensor 25 correspond to other detector of the present invention.

Hereinafter, antitheft systems according to other embodiments of the present invention will be explained. The antitheft systems described in the following embodiments are basically identical with the above-described antitheft system 1 of the first embodiment except that the controller 11 of the burglar alarm unit 3 executes different processing.

The reference numerals used in the explanations for the following embodiments will be thus identical with those used in the first embodiment.

Second Embodiment

Figure 6A:
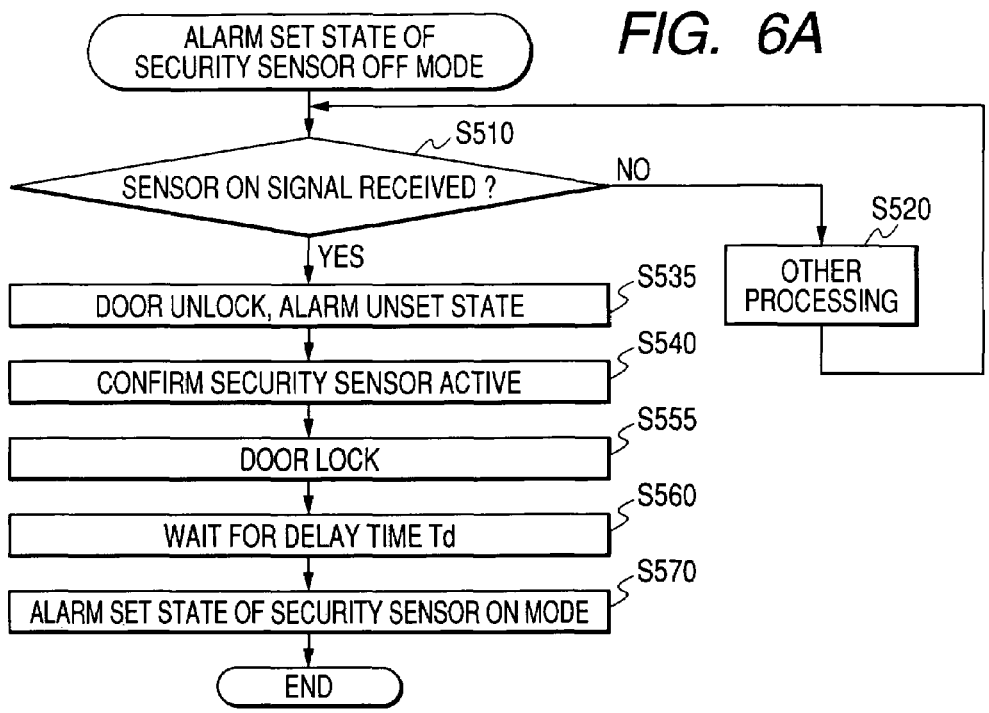
FIGS. 6A and 6B are flowcharts of the processing executed by the controller of the burglar alarm unit in accordance with a second embodiment of the present invention, to shift the operation mode in response to each of a sensor ON signal and a sensor OFF signal.
Figure 6B:
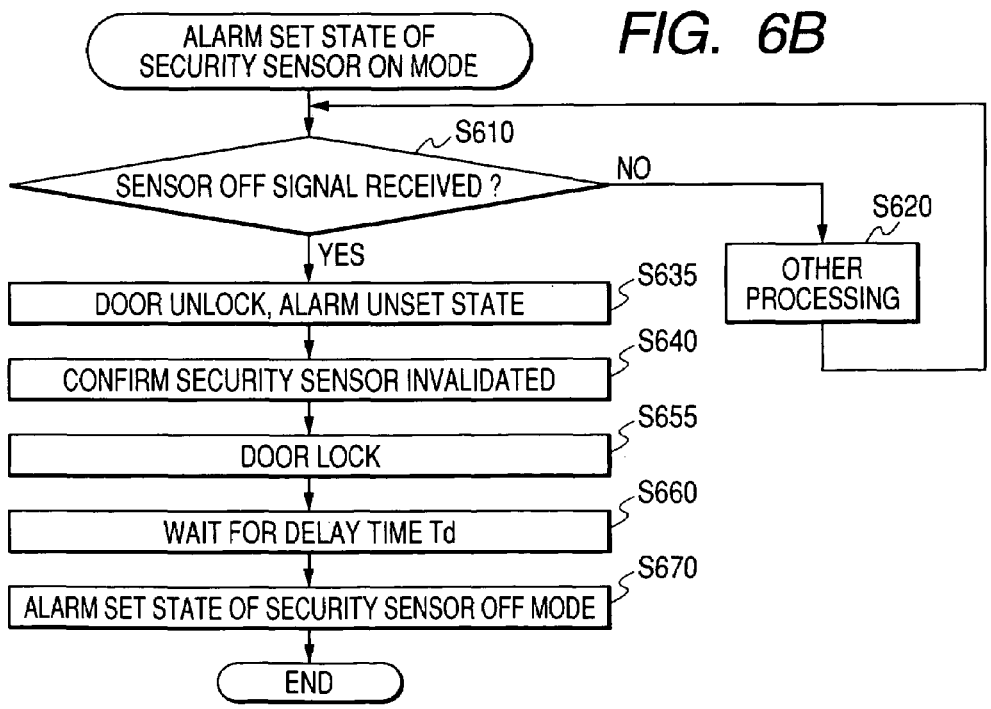

An antitheft system 1 according to a second embodiment of the present invention is different from the above-described antitheft system 1 of the first embodiment in that the controller 11 of the burglar alarm unit 3 executes the processing of FIG. 6A instead of executing the processing of FIG. 5A and also executes the processing of FIG. 6B instead of executing the processing of FIG. 5B. In the flowcharts of FIGS. 6A and 6B, the steps identical with those shown in FIGS. 5A and 5B are denoted by the same step numbers.

The processing of FIG. 6A is different from the processing of FIG. 5A in the following two points. First, the controller 11 executes the step S535 of FIG. 6A instead of executing the step S530 of FIG. 5A. In the step S535, the controller 11 unlocks all doors and brings the burglar alarm unit 3 into the alarm unset state without performing the answer back informing accomplishment of door unlock. Second, the controller 11 executes the step S555 of FIG. 6A instead of executing the step S550 of FIG. 5A. In the step S555, the controller 11 locks all doors without performing the answer back informing accomplishment of door lock.

Similarly, the processing of FIG. 6B is different from the processing of FIG. 5B in the following two points. First, the controller 11 executes the step S635 of FIG. 6B instead of executing the step S630 of FIG. 5B. In the step S635, the controller 11 unlocks all doors and brings the burglar alarm unit 3 into the alarm unset state without performing the answer back informing accomplishment of door unlock. Second, the controller 11 executes the step S655 of FIG. 6B instead of executing the step S650 of FIG. 5B. In the step S655, the controller 11 locks all doors without performing the answer back informing accomplishment of door lock.

Namely, according to the second embodiment of the present invention, the controller 11 does not cause the hazard lamps 17 to flicker for the answer back informing accomplishment of door lock or door unlock when the burglar alarm unit 3 successively shifts into the alarm unset state and into the alarm set state in response to the sensor ON signal or the sensor OFF signal.

According to the second embodiment of the present invention, it becomes possible to prevent any unauthorized person from knowing that automotive doors are in the unlock condition and the burglar alarm unit is in the alarm unset state temporarily in a situation the user is not present in the vicinity of his/her automotive vehicle. Thus, it becomes possible to improve the reliability of the antitheft system.

Third Embodiment

Figure 7A:
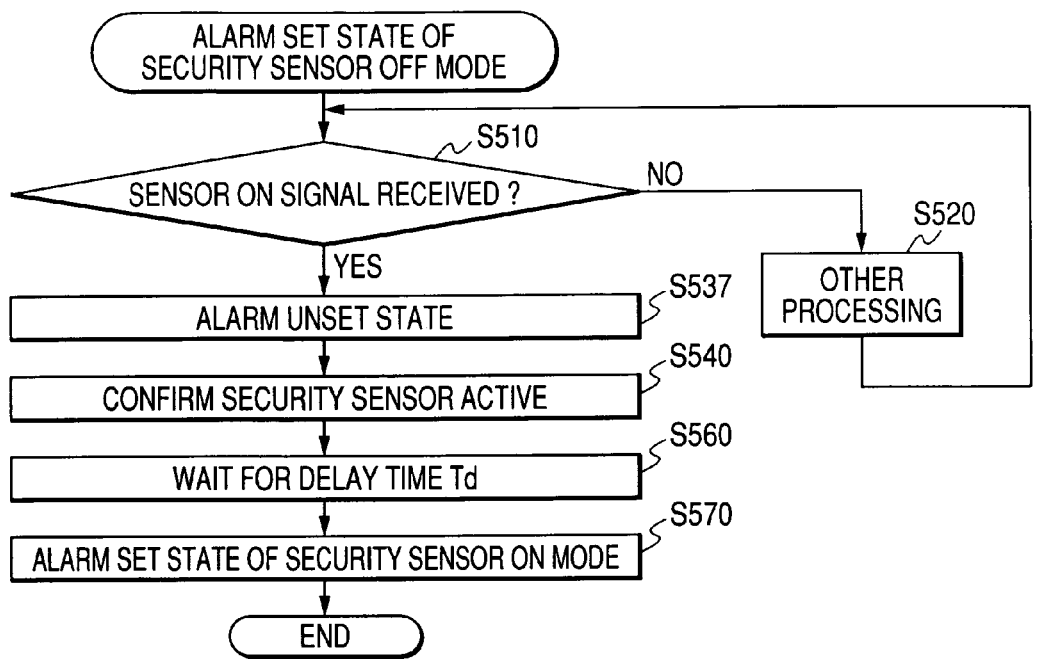
FIGS. 7A and 7B are flowcharts of the processing executed by the controller of the burglar alarm unit in accordance with a third embodiment of the present invention, to shift the operation mode in response to each of a sensor ON signal and a sensor OFF signal.
Figure 7B:
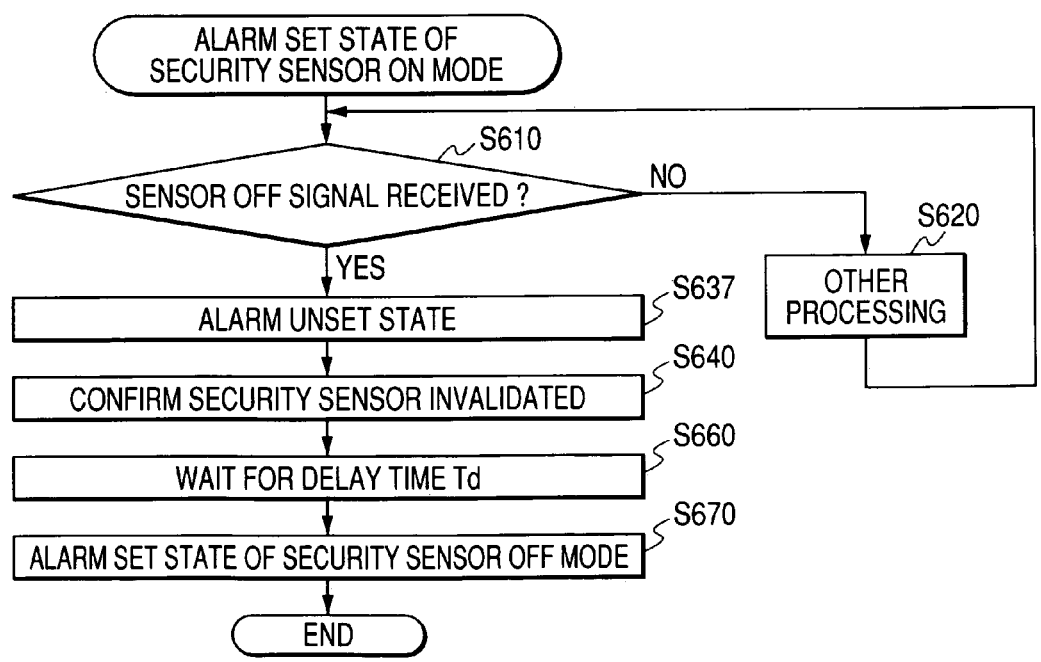

An antitheft system 1 according to a third embodiment of the present invention is different from the above-described antitheft system 1 of the second embodiment in that the controller 11 of the burglar alarm unit 3 executes the processing of FIG. 7A instead of executing the processing of FIG. 6A and also executes the processing of FIG. 7B instead of executing the processing of FIG. 6B. In the flowcharts of FIGS. 7A and 7B, the steps identical with those shown in FIGS. 6A and 6B are denoted by the same step numbers.

The processing of FIG. 7A is different from the processing of FIG. 6A in the following two points. First, the controller 11 executes the step S537 of FIG. 7A instead of executing the step S535 of FIG. 6A. In the step S537, the controller 11 brings the burglar alarm unit 3 into the alarm unset state without unlocking all doors. Second, the controller 11 does not execute the processing of step S555.

Similarly, the processing of FIG. 7B is different from the processing of FIG. 6B in the following two points. First, the controller 11 executes the step S637 of FIG. 7B instead of executing the step S635 of FIG. 6B. In the step S637, the controller 11 brings the burglar alarm unit 3 into the alarm unset state without unlocking all doors. Second, the controller 11 does not execute the processing of step S655.

Namely, according to the third embodiment of the present invention, the controller 11 does not unlock the doors when the burglar alarm unit 3 shifts into the alarm unset state in response to the sensor ON signal or the sensor OFF signal. Furthermore, the controller 11 does not cause the hazard lamps 17 to flicker for the answer back.

According to the third embodiment of the present invention, it becomes possible to prevent any doors from being unlocked in a situation the user is not present in the vicinity of his/her automotive vehicle. Thus, it becomes possible to improve the reliability of the antitheft system.

Fourth Embodiment

Figure 8A:
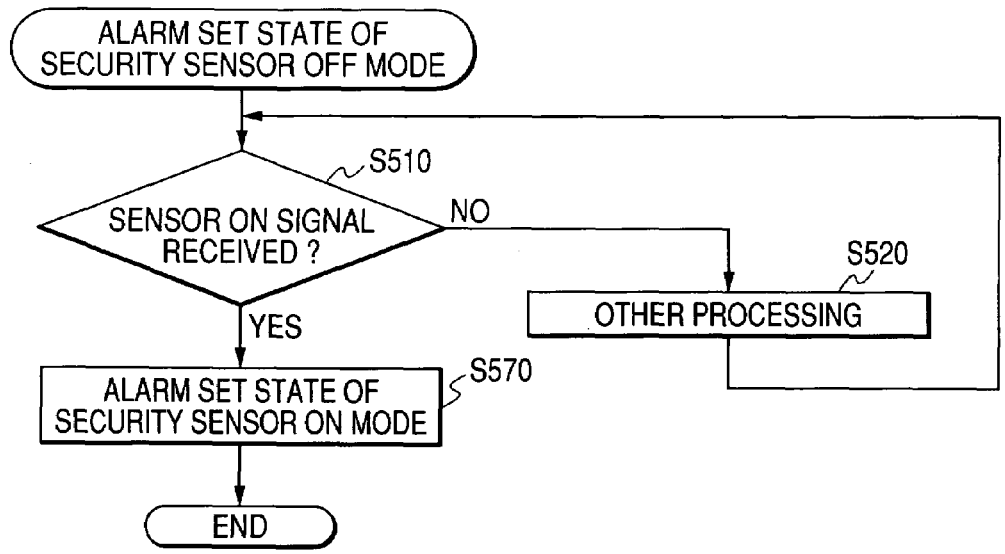
FIGS. 8A and 8B are flowcharts of the processing executed by the controller of the burglar alarm unit in accordance with a fourth embodiment of the present invention, to shift the operation mode in response to each of a sensor ON signal and a sensor OFF signal.
Figure 8B:
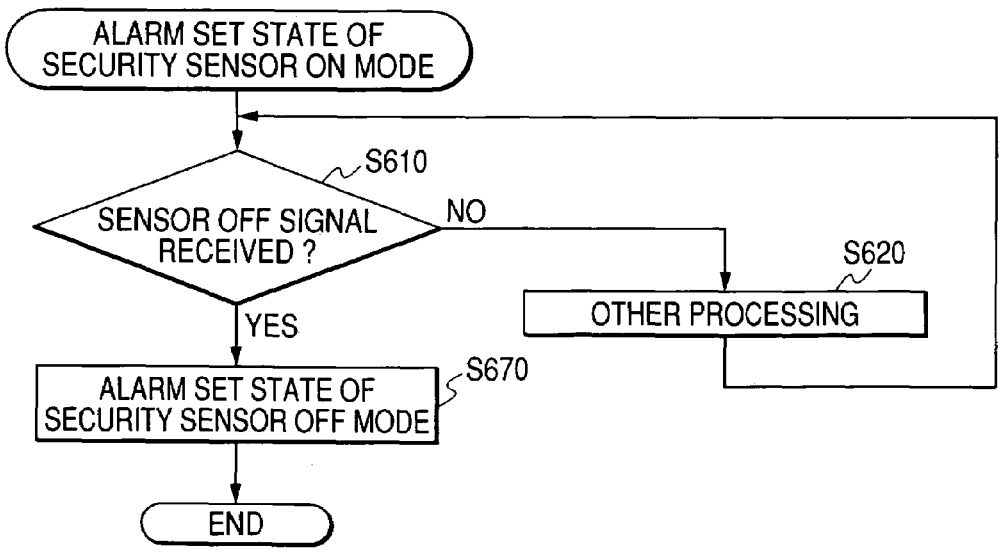

An antitheft system 1 according to a fourth embodiment of the present invention is different from the above-described antitheft system 1 of the first embodiment in that the controller 11 of the burglar alarm unit 3 executes the processing of FIG. 8A instead of executing the processing of FIG. 5A and also executes the processing of FIG. 8B instead of executing the processing of FIG. 5B. In the flowcharts of FIGS. 8A and 8B, the steps identical with those shown in FIGS. 5A and 5B are denoted by the same step numbers.

The processing of FIG. 8A is different from the processing of FIG. 5A in that all of the steps S530 to S560 are removed. Similarly, the processing of FIG. 8B is different from the processing of FIG. 5B in that all of the steps S630 to S660 are removed.

More specifically, the controller 11 of the burglar alarm unit 3 according to the fourth embodiment of the present invention operates in the following manner.

When the burglar alarm unit 3 is in the alarm set state of security sensor OFF mode, the controller 11 executes step S510 to make a judgment as to whether or not the sensor ON signal is received. When the sensor ON signal is received (i.e. YES in step S510), the controller 11 proceeds to step S570 to shift the operation mode into the security sensor ON mode while maintaining the alarm set state unchanged. On the other hand, when the burglar alarm unit 3 is in the alarm set state of security sensor ON mode, the controller 11 executes step S610 to make a judgment as to whether or not the sensor OFF signal is received. When the sensor OFF signal is received (i.e. YES in step S610), the controller 11 proceeds to step S670 to shift the operation mode into the security sensor OFF mode while maintaining the alarm set state unchanged.

According to the above-described fourth embodiment of the present invention, it becomes possible to improve the usability of the antitheft system. The burglar alarm unit 3 can be always held in the alarm set state when the operation mode of the burglar alarm unit 3 is switched between the security sensor OFF mode and the security sensor ON mode in response to a remote control done by the user. Thus, the fourth embodiment of the present invention assures reliability of the antitheft system.

Fifth Embodiment

Figure 9:
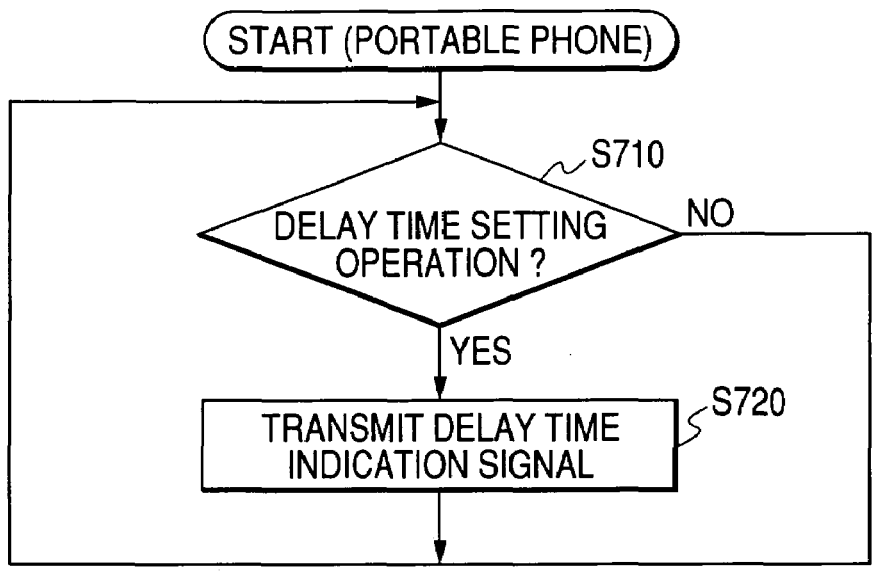
FIG. 9 is a flowchart of the processing executed by a portable phone of the antitheft system in accordance with a fifth embodiment of the present invention, to transmit a delay time indication signal.

An antitheft system 1 according to a fifth embodiment of the present invention is different from the antitheft systems 1 of the above-described first to third embodiments in that a user can execute a time setting operation of FIG. 9. More specifically, as shown in FIG. 9, the controller 11 executes step S710 to check whether or not a user makes a time setting operation on the portable phone 7 to determine a delay time. When the time setting operation is done (i.e. YES in step S710), the controller 11 proceeds to step S720 to transmit a delay time indication signal containing information relating to the delay time being determined by the above time setting operation. For example, the user can depress some specific keys on the portable phone 7 in a predetermined order for making the time setting operation. Then, the user can input numerical data representing a desirable delay time (e.g. in the units of second).

Furthermore, like the previously described sensor ON signal or the sensor OFF signal, the delay time indication signal transmitted from the portable phone 7 arrives at the information center 9 and the information center 9 delivers this signal everywhere within the communication area of this information center 9. Accordingly, if the automotive vehicle installing the burglar alarm unit 3 is present in the communication area of information center 9, the data communication unit 31 of the burglar alarm unit 3 will receive the delay time indication signal transmitted from the portable phone 7.

Figure 10:
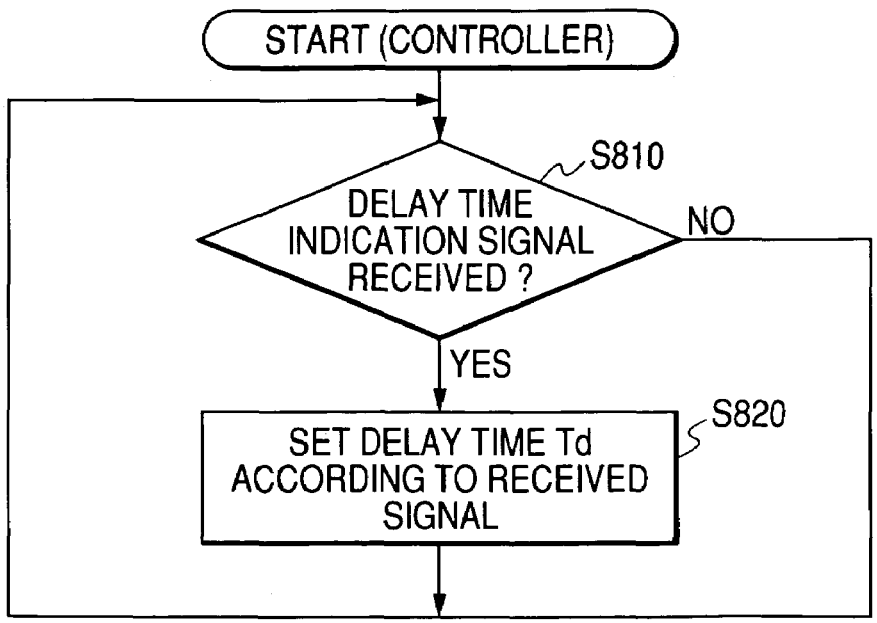
FIG. 10 is a flowchart of the processing executed by the controller of the burglar alarm unit of the antitheft system in accordance with the fifth embodiment of the present invention, to set a delay time in response to the delay time indication signal.

Furthermore, according to the fifth embodiment of the present invention, the controller 11 of the burglar alarm unit 3 executes the processing shown in FIG. 10. More specifically, the controller 11 executes the processing of step S810 to make a judgment as to whether or not the delay time indication signal is received by the data communication unit 31. When the delay time indication signal is received (i.e. YES in step S810), the controller 11 proceeds to step S820 to set the delay time Td being equalized with the time information contained in the received delay time indication signal. The delay time Td being thus set is used in the steps S560 and S660 of FIGS. 5A-5B and 7A-7B.

According to the above-described fifth embodiment of the present invention, a user can arbitrarily set the above-described delay time Td for the burglar alarm unit 3 through a remote control realized by the portable phone 7.

The above-described embodiments are mere samples for bringing the present invention into practice. Accordingly, the present invention is not limited to the above-described embodiments and can be modified in various ways without departing from the gist of the present invention.

For example, the first embodiment of the present invention can be modified in the following manner.

First, in the step S420 of FIG. 4, the portable phone 7 can continuously transmit an unset signal for bringing the burglar alarm unit 3 into the alarm unset state and a set signal for bringing the burglar alarm unit 3 into the alarm set state.

When the controller 11 of the burglar alarm unit 3 receives the above-described unset signal from the portable phone 7 under a condition that the burglar alarm unit 3 is in the alarm set state of security sensor OFF mode, the controller 11 executes the processing of step S530 shown in FIG. 5A. Subsequently, when the controller 11 receives the above-described set signal from the portable phone 7, the controller 11 executes the processing of steps S540 to S570 shown in FIG. 5A. As apparent from the foregoing, when the controller 11 successively receives the unset signal and the set signal in a condition that the burglar alarm unit 3 is in the alarm set state of security sensor OFF mode, the controller 11 first shifts the burglar alarm unit 3 into the alarm unset state according to the unset signal and then shifts the burglar alarm unit 3 into the alarm set state according to the set signal. After accomplishing such a sequential shifting operation, the burglar alarm unit 3 continuously operates in the alarm set state of security sensor ON mode.

Meanwhile, in the step S440 of FIG. 4, the portable phone 7 can continuously transmit the unset signal for bringing the burglar alarm unit 3 into the alarm unset state, a security sensor cancel signal for invalidating the signal of security sensor 19, and the set signal for bringing the burglar alarm unit 3 into the alarm set state.

When the controller 11 of the burglar alarm unit 3 receives the above-described unset signal from the portable phone 7 under a condition that the burglar alarm unit 3 is in the alarm set state of security sensor ON mode, the controller 11 executes the processing of step S630 shown in FIG. 5B. Next, when the controller 11 receives the security sensor cancel signal, the controller 11 executes the processing of step S640 shown in FIG. 5B. Subsequently, when the controller 11 receives the set signal, the controller 11 executes the processing of steps S650 to 670 shown in FIG. 5B. As apparent from the foregoing, when the controller 11 successively receives the unset signal, the security sensor cancel signal, and the set signal in a condition that the burglar alarm unit 3 is in the alarm set state of security sensor ON mode, the controller 11 first shifts the burglar alarm unit 3 into the alarm unset state according to the unset signal, then confirms an operation done for invalidating the signal of security sensor 19 according to the security sensor cancel signal, and then shifts the burglar alarm unit 3 into the alarm set state according to the set signal. After accomplishing such a sequential shifting operation, the burglar alarm unit 3 continuously operates in the alarm set state of security sensor OFF mode.

Even in the above-described modified embodiment, the effects similar to those of the first embodiment can be obtained. According to the above-described modified embodiment, the unset signal and the set signal successively transmitted from the portable phone 7 in the step S420 of FIG. 4 correspond to the first mode shift command signal of the present invention. The unset signal, the security sensor cancel signal, and the set signal successively transmitted from the portable phone 7 in the step S440 of FIG. 4 correspond to the second mode shift command signal of the present invention. Moreover, the above-described modification can be similarly applied to the second and third embodiments of the present invention.

According to the above-described various embodiments and the modified embodiment, both the first mode shift command signal and the second mode shift command signal are transmitted from the portable phone 7 via the information center 9 to the automotive burglar alarm unit 3. It is however possible to slightly modify their arrangements in such a manner that these command signals are directly transmitted from the keyless remote controller 5 to the burglar alarm unit 3. For example, in the first to fourth embodiments, it is desirable that the keyless remote controller 5 has a button for transmitting the sensor ON signal and a button for transmitting the sensor OFF signal. The keyless remote controller 5 transmits a corresponding signal when one of these buttons is depressed. In this case, the keyless remote controller 5 corresponds to the portable unit of the present invention.

Furthermore, according to the above-described various embodiments, all doors of an automotive vehicle are locked or unlocked in response to the signal transmitted from the keyless remote controller 5 when the user depresses the button 5a. However, it is possible to lock or unlock all doors, for example, by using a so-called smart system, or when a user inserts a key plate into a key cylinder of a driver's seat door and turns it.

Furthermore, in the above-described embodiments, the security sensor 19 is not limited to the intrusion sensor only. Therefore, any other security sensors, such as a glass crack sensor for detecting a glass being broken, an inclination sensor for detecting an inclined vehicle body, an impact sensor for detecting any impact force applied on the automotive vehicle or the like, can be used.

What is claimed is:

1. An antitheft unit installed in an automotive vehicle, comprising:
    a first sensor specifically detecting a signal indicating a predetermined theft-suspicious act done to the automotive vehicle in which a second sensor other than the first sensor is installed, and
    a controller configured to control an alarm to be generated against the predetermined theft-suspicious act in three selective states consisting of an alarm unset state for generating no alarm, a first alarm set state for generating the alarm under a condition where signals from both the first sensor and the second sensor are validated and used for performing the control, a second alarm set state for generating the alarm under a condition where the signal from only the second sensor is validated and used for performing the control,
    wherein the controller comprises
    a determining component configured to determine whether or not a signal commanding a shift is issued; and
    a controlling component configured to control the shift among the alarm unset state, the first alarm set state, and the second alarm set state such that the shift between the states is responsive to the signal, automatically and without a user's operation necessary for the shift performed manually on the automotive vehicle, when, it is determined that the signal is issued.

2. The antitheft unit according to claim 1, wherein the signal commands a shift from the second alarm set state to the first alarm set state and the controlling component comprises
    means for determining whether or not a current state of the automotive vehicle is in the second alarm set state and
    means for controlling the shift such that the second alarm set state is shifted to the first alarm set state automatically via the alarm unset state when it is determined that the current state is in the second alarm set state.

3. The antitheft unit according to claim 2, wherein the signal commands a shift from the first alarm set state to the second alarm set state and the controlling component additionally comprises
    means for determining whether or not a current state of the automotive vehicle is in the first alarm set state and
    means for controlling the shift such that the first alarm set state is shifted to the second alarm set state automatically via the alarm unset state when it is determined that the current state is in the first alarm set state.

4. The antitheft unit according to claim 3, wherein a transit time required for the controller to be brought to the alarm unset state when the state of the controller shifts between the first and second alarm set states in response to the signal, is shorter than a start-up time required for the controller automatically to shift from the alarm unset state into the first or second alarm set state when a specific alarm set condition is established.

5. The antitheft unit according to claim 1, wherein the signal commands a shift from the first alarm set state to the second alarm set state and the controlling component comprises
    means for determining whether or not a current state of the automotive vehicle is in the first alann set state and
    means for controlling the shift such that the first alarm set state is shifted to the second alarm set state automatically via the alarm unset state when it is determined that the current state is in The first alarm set state.

6. The antitheft unit according to claim 1, which is incorporated in a system with a portable unit bandied by a user to issue the signal.

7. The antitheft unit according to claim 1, which is incorporated in a system with a portable unit handled by a user to issue the signal and an information center relaying the signal issued from the portable unit to the antitheft unit.

8. The antitheft unit according to claim 1, wherein the signal commands a shift from the second alarm set state to the first alarm set state and the controlling component additionally comprises
    means for determining whether or not a current state of the automotive vehicle is in the second alarm set state and
    means for controlling the shift such that the second alarm set state is shifted to the first alarm set state automatically via the alarm unset state when it is determined tat the current state is in the fist alarm set state.

9. The antitheft unit according to claim 8, wherein a transit time required for the controller to be brought to the alarm unset state when the state of the controller shifts between the first and second alarm set states in response to the signal, is shorter than a start-up time required for the controller automatically to shift from the alarm unset state into the first or second alarm set state when a specific alarm set condition is established.

10. The antitheft unit according to claim 1, wherein the automotive vehicle has a door having a locked state and an unlocked state and subjected to a door unlock control by the controller, and the controller is configured to forbid the door to be subjected the door unlock control when the state of the controller is shifted between the first and second alarm set state in which the door is locked via the alarm unset state in response to the signal.

11. The antitheft unit according to claim 10, wherein the controller is configured to send to a user an answer back including a predetermined activation of an electric load of the automotive vehicle when the state of the controller is shifted between the first and second alarm set state via the alarm unset state in response to the signal.

12. The antitheft unit according to claim 11, wherein the electric load of the automotive vehicle activated when the state of the controller is shifted between the first and second alarm set state via the alarm unset state in response to the signal is a hazard lamp.

13. An antitheft unit installed in an automotive vehicle including a door having a locked state and an unlocked state and subjected to a door lock control and a door unlock control, comprising:
    a first sensor specifically detecting a signal indicating a predetermined theft-suspicious act done to the automotive vehicle in which a second sensor other than the first sensor is installed, and a controller configured to control an alarm to be generated against the predetermined theft-suspicious act in three selective states consisting of an alarm unset state in which the door of the automotive vehicle is in the unlocked state and no alarm is generated, a first alarm set state in which the alarm is generated under a condition where signals from both the first sensor and the second sensor are validated and used for performing the control and the door of the automotive vehicle is in the locked state, and a second alarm set state in which the alarm is generated under a condition where the signal from only the second sensor is validated and used for performing the control and the door of the automotive vehicle is in the locked state, wherein the controller comprises a determining component configured to determine whether or not a signal commanding a shift is issued; and a controlling component configured to control the shift among the alarm unset state, the first alarm set state, and the second alarm set state such that the shift between the states is responsive to the signal accompanying changes in the states of the door, automatically and without a user's operation necessary for the shift performed manually on the automotive vehicle, when it is determined that the signal is issued.

14. The antitheft unit according to claim 13, which is incorporated in a system with a portable unit configured to be handled by a user to issue the signal.

15. The antitheft unit according to claim 14, wherein the portable unit is a portable phone.

16. The antitheft unit according to claim 14, which is incorporated in a system with the portable unit and an information center relaying the signal issued from the portable unit to the antitheft unit.

17. The antitheft unit according to claim 16, wherein the controller is configured to send to a user an answer back including a predetermined activation of an electric load of the automotive vehicle when the state of the controller is brought to the alarm unset state.

18. The antitheft unit according to claim 17, wherein a transit time required for the controller to be brought to the alarm unset state when the state of the controller shifts between the first and second alarm set states in response to the signal, is shorter than a start-up time required for the controller automatically to shift from the alarm unset state into the first or second alarm set state when a specific alarm set condition is established.

19. The antitheft unit according to claim 14, wherein the controller is configured to send to a user an answer back including a predetermined activation of an electric load of the automotive vehicle when the state of the controller is brought to the alarm unset state.

20. The antitheft unit according to claim 19, wherein a transit dine required for the controller to be brought to the alarm unset state when the state of the controller shifts between the first and second alarm set states in response to the signal, is shorter than a start-up time required for the controller automatically to shift from the alarm unset state into the first or second alarm set state when a specific alarm set condition is established.

* * * * *